April 21, 1925.
J. W. WINTER
DIES
Filed Feb. 27, 1922
1,534,822
5 Sheets-Sheet 1
FIG. I.
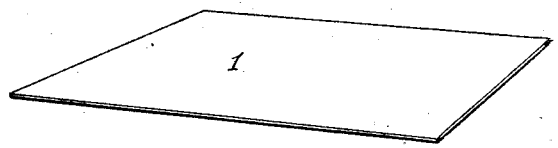
FIG. II.
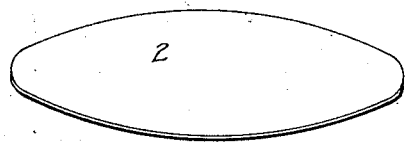
FIG. III.
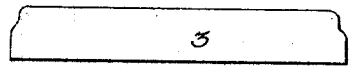
FIG. IV.
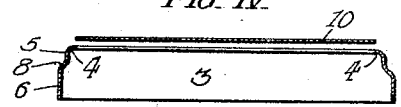
FIG. V.
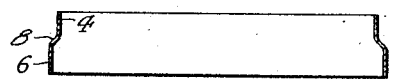
FIG. VI.
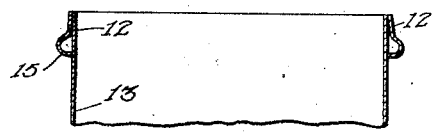
Inventor,
Joseph William Winter,
by
Attorney

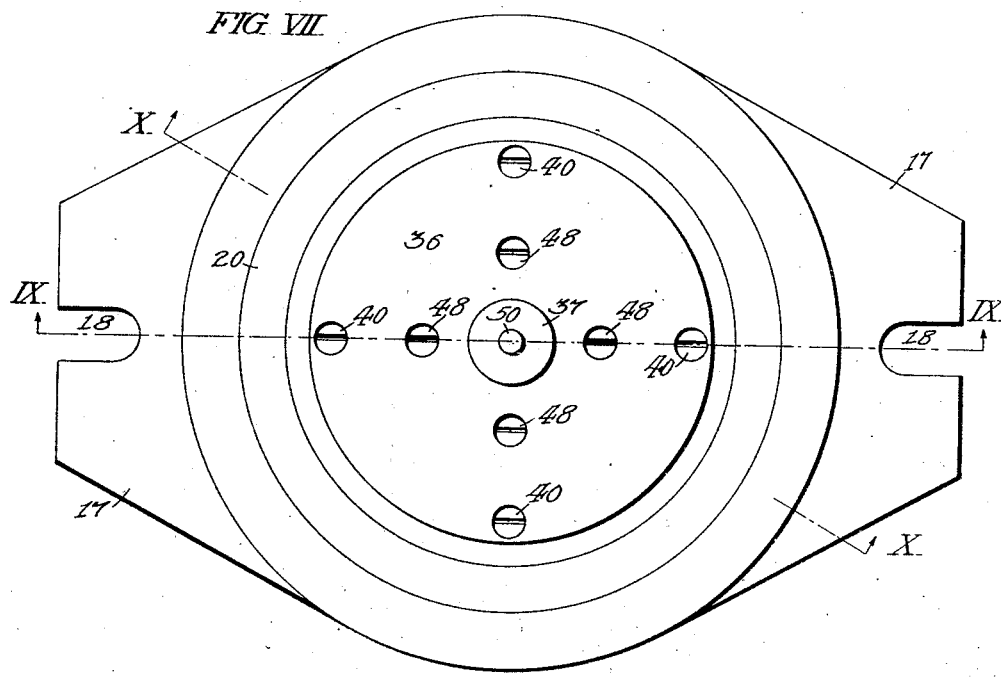
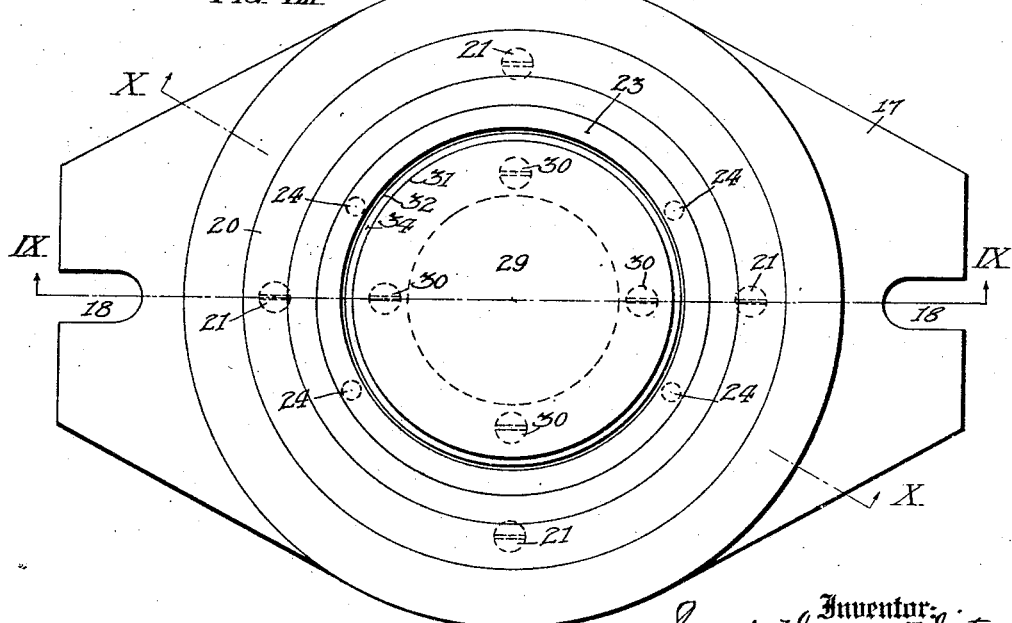

April 21, 1925.  J. W. WINTER  1,534,822
DIES
Filed Feb. 27, 1922   5 Sheets-Sheet 3
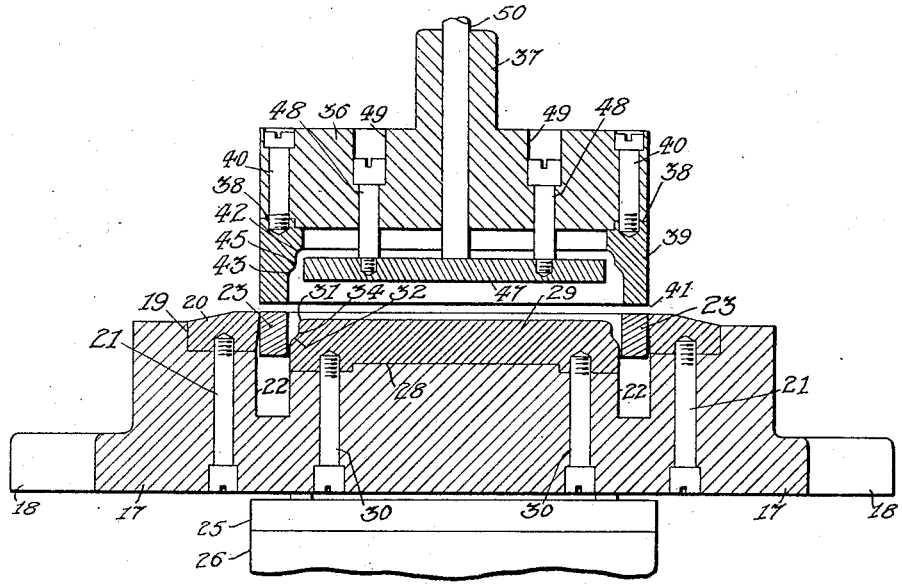
FIG. IX.
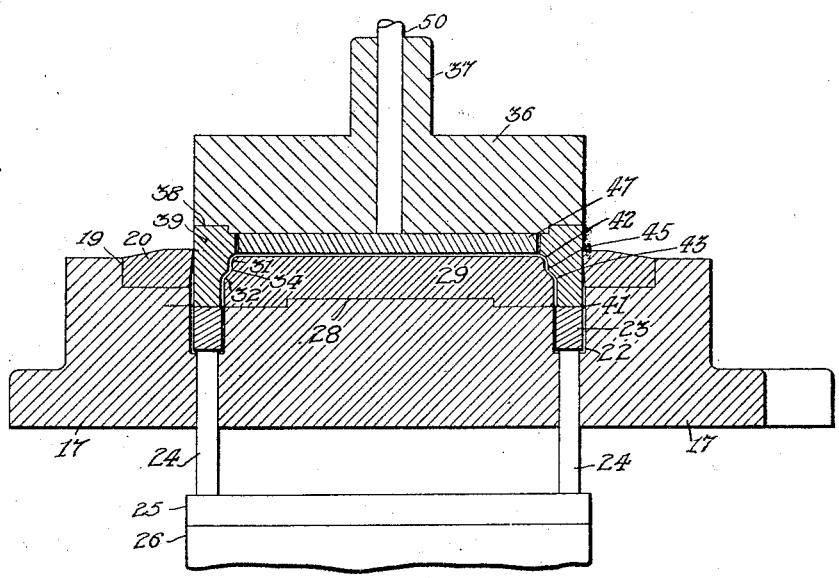
FIG. X.
Inventor:
Joseph William Winter,
by [signature],
Attorney.

April 21, 1925. 1,534,822
J. W. WINTER
DIES
Filed Feb. 27, 1922 5 Sheets-Sheet 4
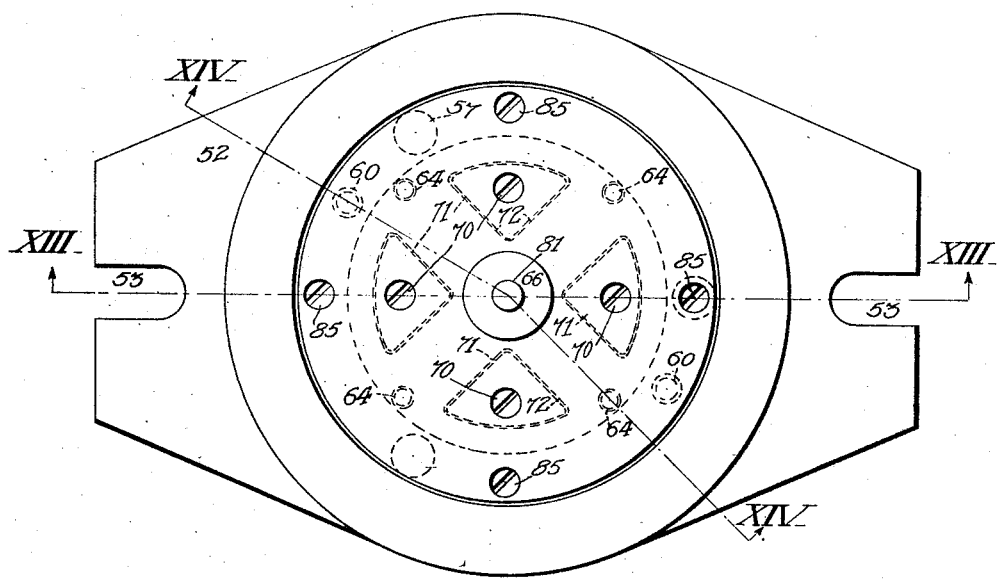
FIG. XI.
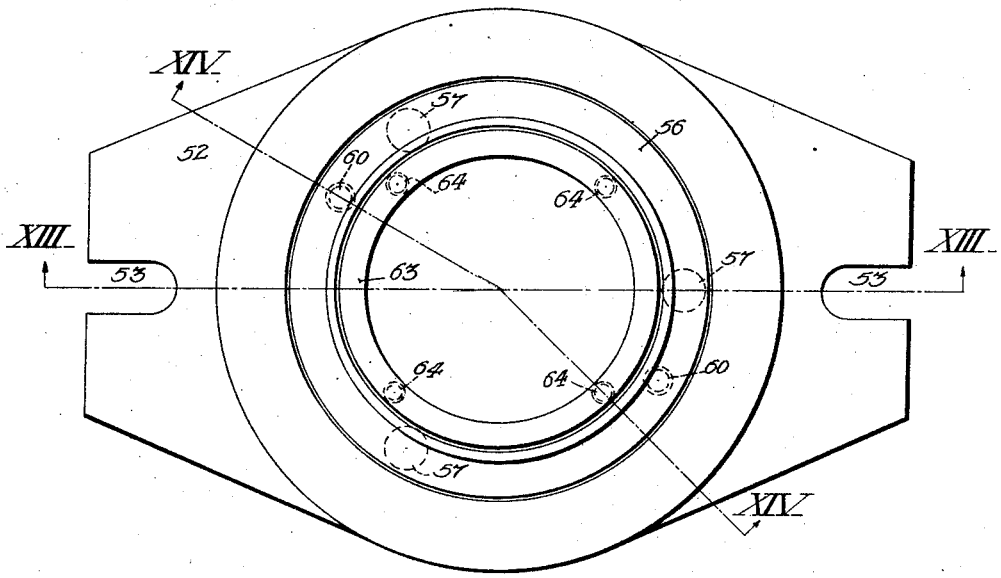
FIG. XII.
Inventor:
Joseph William Winter

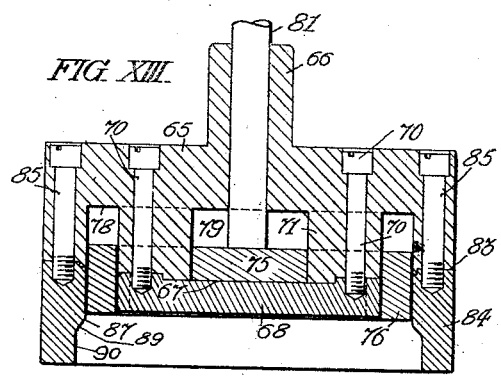
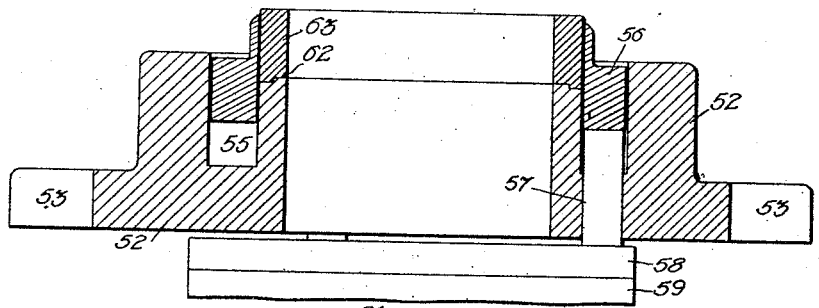
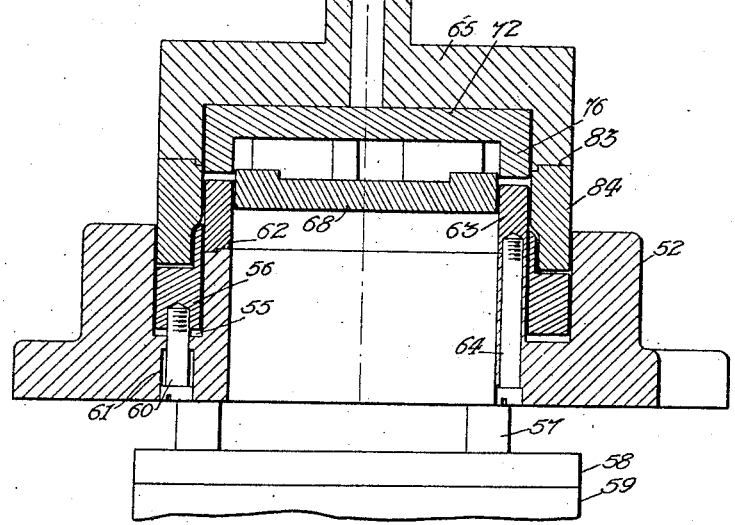

Patented Apr. 21, 1925.

1,534,822

UNITED STATES PATENT OFFICE.

JOSEPH WILLIAM WINTER, OF PENFIELD, PENNSYLVANIA.

DIES.

Application filed February 27, 1922. Serial No. 539,683.

*To all whom it may concern:*

Be it known that I, JOSEPH WILLIAM WINTER, a citizen of the United States, residing at Penfield, in the county of Delaware and State of Pennsylvania, have invented a certain new and useful Improvement in Dies, whereof the following is a specification, reference being had to the accompanying drawings.

My invention relates to combination blanking, drawing, forming and expanding dies adapted to form seamless tubular bodies from primarily plane sheet metal.

As hereinafter described, said dies are used in effecting a process, including four principal steps, to wit, first, they punch a circular blank, from a plane sheet of metal; second, they press said blank to form a cup shaped body, including a rim with two cylindrical zones, of different diameters, and a plane circular web extending transversely to said rim; third, they punch a circular piece from the center of said web, leaving an annular portion of said web extending inwardly from said rim, transversely to the axis of said body; and fourth, they expand said inwardly extending web portion outwardly, to cylindrical form, in continuation of the smaller cylindrical zone previously formed on said body.

In the form of my invention hereinafter described; two sets of dies are employed to perform the complete cycle of operation steps above contemplated; the first set of said dies being used to perform the first and second steps aforesaid, and the second set of dies being used to perform the third and fourth steps aforesaid.

My invention includes the various novel features of construction and arrangement hereinafter more definitely specified.

In said drawings; Fig. I is a perspective view of a sheet of metal, such as is fed to the die mechanism hereinafter described. Fig. II is a perspective view of a circular blank punched from said sheet by said first step in the operation of said mechanism. Fig. III is a side elevation of said circular blank, pressed to form a cup-shaped body, by said second step in the operation of said mechanism. Fig. IV is a diametrical sectional view of said cup-shaped blank, with its center punched out, by the third step in the operation of said mechanism. Fig. V is a diametrical sectional view of the cylindrical band formed by the fourth step in the operation of said mechanism. Fig. VI is a diametrical sectional view of said band as applied to a cylindrical container. Fig. VII is a plan view of the first set of dies aforesaid. Fig. VIII is a plan view of the lower die members of the set shown in Fig. VII. Fig. IX is a vertical sectional view of said first set of dies, taken on the line IX—IX in Figs. VII and VIII, showing them in their initial position. Fig. X is a vertical sectional view of said first set of dies, taken on the line X—X in Figs. VII and VIII, but showing them in the position in which they form said cup-shaped body. Fig. XI is a plan view of the second set of dies aforesaid. Fig. XII is a plan view of the lower die members of said second set of dies, shown in Fig. XI. Fig. XIII is a vertical sectional view, taken on the line XIII—XIII in Figs. XI and XII, showing said second set of dies in their initial position. Fig. XIV is a vertical sectional view, similar to Fig. XIII but showing said second set of dies in the position in which they expand the blank to cylindrical form.

Referring to Figs. I to VI inclusive; the plane stock sheet 1, shown in perspective in Fig. I, may be of any suitable metal, for instance, mild steel, and is of rectangular configuration, of such size that the circular blank 2, indicated in Fig. II, may be punched therefrom. Said blank 2 is then pressed and drawn, to form the cup-shaped body 3 shown in Fig. III. Said body 3 includes the plane web 4, extending transversely to its axis, and has its circumference formed in two cylindrical zones 5 and 6, of different diameters, connected by the conical shoulder 8. Said body 3 is then punched to remove the concentric disk portion 10 thereof, from said web 4, indicated in Fig. IV; leaving an annular portion of said web 4 extending transversely to the axis of said body. Said body 3 is then expanded at its portion 4, until the latter is of cylindrical configuration and of the same diameter as its cylindrical zone 5.

Said body 3 is adapted to form a reinforcing and closure supporting band 12 upon the cylindrical shell 13 of an ice-cream can or other container of the class contemplated in Letters Patent of the United States No. 1,395,298 granted to Walter H. Richman November 1, 1921. The cylindrical skirt portion 6 of said body 3 is curled inwardly, into contact with said container body 13, as indicated at 15 in Fig. VI; during the operation of pressing said band upon said shell.

Referring to Figs. VII to X inclusive; the bolster 17 is provided with opposite end notches 18 for bolts to rigidly connect it with the bed of a die press and has the annular seat 19 in its top for the female shear ring 20 which is rigidly connected with said bolster 17 by the four screws 21. Said bolster 17 has the recess 22 for the blank holder ring 23 which is carried by the four pins 24 in rigid relation with the base ring 25 which rests upon the spring barrel 26 whereby said blank holder ring 23 is initially presented flush with the top of said female shear ring 20, as shown in Fig. IX. Said bolster 17 also has the annular seat 28 for the drawing die 29 which is rigidly connected with said bolster by the bolts 30. Said drawing die 29 has its circumference formed in two cylindrical zones 31 and 32 connected by the conical shoulder 34; to fit within and form the aforesaid stepped cylindrical configuration, 5, 6, 8, desired for said completed band 12.

The punch holder 36 has the axial shank 37 for engagement with the upper plunger of said press, and has the annular seat 38 for the male shear ring 39 which is rigidly connected with said holder, by the four screws 40. Said male shear ring 39 has its lower outer edge 41 of the diameter of said blank 2, and adapted to cooperate with said female shear ring 20 to punch said blank 2. Said male shear ring 39 has cylindrical zones 42 and 43 connected by the conical zone 45, and respectively in cooperative relation with said zones 31, 32 and 34 on said die 29; and of the configuration of the perimeter of said body 3 shown in Fig. III. Said punch holder 36 also carries the knockout plate 47 which is connected therewith by the plunger screws 48 having heads mounted to reciprocate in the recesses 49 in said holder 36. Said plate 47 is adapted to be operated by the knock-out stud 50.

The set of dies shown in Figs. VII to X inclusive are operated as follows: With the dies in the position shown in Fig. IX; a rectangular stock plate 1 is laid upon said female die shear ring 20, beneath the male die shear ring 39, in the position indicated in Fig. IX. Thereupon, said holder 36 and bolster 17 are relatively moved toward each other in coaxial relation, and a circular blank 2 thus punched from said sheet 1, by the cooperation of said die members 20 and 39, as the first step in the operation of said mechanism. Continued relative movement of said holder 36 with respect to said bolster 17 causes said blank 2 to be drawn and formed between said die members 29 and 39 to the form shown in Figs. III and X; said blank holder ring 23 being thrust into its recess 22 while opposed to said die ring 39, and thus maintaining the margin of said blank substantially flat during that second step of the operation of forming said body 3. Thereupon, said holder 36 and bolster 17 are relatively moved apart, to a distance sufficient to permit the withdrawal of the body 3 formed therein. During such movement, said plate 47 is operated by said knockout stud 50 to knock out said completed body 3 thus formed. When said body has been withdrawn from between the opposed die members; the latter are relatively moved to their initial position shown in Fig. IX, and the two steps of the operation above described repeated.

Referring to Figs. XI to XIV, which show the second set of dies above contemplated, which are adapted to perform the third and fourth steps in the operation described; the bolster 52 is provided with opposite end notches 53 for bolts to rigidly connect it with the bed of a die press and has the annular recess 55 for the body holder ring 56. Said ring 56 is carried by the three pins 57 in rigid relation with the base ring 58 which rests upon the spring barrel 59 whereby said holder ring 56 is initially presented in the raised position shown in Fig. XIII. Said ring 56 is provided with two stop screws 60 which reciprocate in recesses 61 in said bolster 52 and limit the upward movement of said ring 56. Said bolster 52 also has the annular seat 62 for the annular expanding and shearing die 63, which is rigidly connected with said bolster by the four bolts 64. Said die member 63 has its inner circular shear edge of the diameter of said disk 10, and its outer cylindrical circumference of the diameter of the zone 31 on said die member 29, which is the internal diameter of the zone 5 in said body 3 shown in Fig. V.

The punch holder 65 has the axial shank 66 for engagement with the upper plunger of said press, and has the annular seat 67 for the male shear plate 68 which is rigidly connected with said holder by the four screws 70. Said four screws 70 extend through respective triangular bosses 71 on said holder 65; which bosses project downwardly between the four spokes 72 of the knockout plate 75, which has the annular rim 76, opposed to said lower die member 62 and mounted to reciprocate in the recess 78 in said holder 65; the hub portion of said knock-out plate 75 being mounted to reciprocate in the axial recess 79 in said holder 65, between said bosses 71. Said knockout plate 75 is adapted to be operated by the knockout stud 81 which is in coaxial relation with said holder 65. Said holder 65 is also provided with the annular seat 83 for the die ring 84 which is rigidly connected therewith by the four bolts 85. Said ring 84 has its internal cylindrical zone 87, of the diameter of the zone 42 of said die ring 39, which is the outer diameter of the zone 5 of said body 3 shown in Fig. V. Said zone 87 of said die ring 84 is connected by the conical zone 89 with the cylindrical zone 90 in said die ring, which zone 90 is of the diameter of said zone 43 in said die member 39, which is the outer diameter of the zone 6 in said body 3 shown in Fig. V; so that said ring 84 is adapted to hold a body 3 in proper relation with said die members 56 and 63, and thus prevent its distortion during the cooperation of said members to effect the third and fourth steps in the formation of said band 12, as hereinafter described.

The set of dies shown in Figs. XI to XIV are operated as follows: With the dies in the position shown in Fig. XIII; a cup-shaped body 3, such as shown in Fig. III, is laid upon said female die shear member 63, beneath the male die shear plate 68, in the position indicated in Fig. XIII. Thereupon, said holder 65 and bolster 52 are relatively moved toward each other in coaxial relation and a circular disk 10 thus punched from the web 4 of said body 3, by the cooperation of said die members 63 and 68, as the third step in the operation of forming said band 12. Continued relative movement of said holder 65 and bolster 52 causes the die member 84 to thrust the holder ring 56 downwardly into its recess 55 in the bolster 52; clamping between said members 84 and 56 the body 3 and drawing the transversely inwardly extending portion 4 thereof over the outer edge of said die member 63 and thus straightening it out to cylindrical form between said members 63 and 84 until said body 3 assumes the configuration shown in Fig. V. Thereupon, said holder 65 and bolster 52 are relatively moved apart, to a distance sufficient to permit the withdrawal of said body 3 formed therein. During such movement, said ring 56 is operated by said pins 57 to knock out said body with respect to said lower die member 63, which is stationary in said bolster 52. During such movement, said plate 75 is also operated, by the knockout stud 81, to knock out said body 3 from the upper die member 84. When said body 3 has been withdrawn from between the opposed die member; the latter are relatively moved to their initial position shown in Fig. XIII, and the third and fourth steps of the operation of forming the band 12 as above described are repeated.

Bodies 3 thus completed to the form shown in Fig. V; may be applied as reinforcing and closure supporting bands 12 upon cylindrical container shells 13, as shown in Fig. VI, and above contemplated. However, such further manipulation of the structure shown in Fig. V is no part of my present invention, and it is to be understood that my invention may be employed in the formation of any form of tubular body from a primarily plane sheet.

Therefore, I do not desire to limit myself to the precise details of construction and arrangement herein set forth, as it is obvious that various modifications may be made therein without departing from the essential features of my invention as defined in the appended claims.

I claim:

1. In die mechanism, the combination with axially opposed annular members (exemplified at 56 and 84) arranged for relative telescopic movement and for axial movement together, and arranged to coaxially clamp between them the cylindrical perimeter of a cup shaped body having two cylindrical zones of different diameters and a central plane circular web transverse to the axis of said zones; of an annular female shear die member adapted to fit within the smaller of said zones and support the margin of said web, and having an internal shear edge; a punch holder, in coaxial relation with said clamping members and rigidly connected with one of them; a knockout plate arranged for relative reciprocation in that holder, having an annular rim opposed to the margin of said web and to said female shear member supporting said margin; means arranged to relatively reciprocate said knockout plate in said holder, including an axial knockout stud; a male shear plate, in coaxial relation with said female shear member, and having an external shear edge, adapted to cooperate with said female shear member; whereby a circular piece is stamped from the center of said web, leaving an annular portion of said web extending inwardly from said zones, transversely to the axis of said body; and means arranged to relatively axially move said two opposed annular clamping members, with said tubular body and relatively to said annular female shear member; whereby the marginal portion of said web is drawn over said female shear member and expanded outwardly, to cylindrical form, in continuation of said smaller cylindrical zone.

2. In die mechanism, the combination with axially opposed annular members (exemplified at 56 and 84) arranged for relative telescopic movement and for axial movement together, and arranged to coaxially clamp between them the cylindrical perimeter of a cup shaped body having a central plane circular web transverse to the axis of said body; of an annular female shear die member adapted to fit within said body and support the margin of said web, and having an internal shear edge; a punch holder, in coaxial relation with said clamping members and rigidly connected with one of them; a knockout plate arranged for relative reciprocation in that holder, having an annular rim opposed to the margin of said web and to said female shear member supporting said margin; means arranged to relatively reciprocate said knockout plate in said holder; a male shear plate, in coaxial relation with said female shear member, and having an external shear edge, adapted to cooperate with said female shear member; whereby a circular piece is stamped from the center of said web, leaving an annular portion of said web extending inwardly from said rim, transversely to the axis of said body; and means arranged to relatively axially move said two opposed annular clamping members, with said tubular body and relatively to said annular female shear member; whereby the marginal portion of said web is drawn over said female shear member and expanded outwardly, to cylindrical form, in continuation of said rim.

3. In die mechanism, the combination with axially opposed annular members arranged for relative telescopic movement and for axial movement together, and arranged to coaxially clamp between them the cylindrical perimeter of a cup shaped body having a central plane circular web transverse to the axis of said body; of an annular female shear die member adapted to fit within said body and support the margin of said web, and having an internal shear edge; a punch holder, in coaxial relation with said clamping members and connected with one of them; a knockout plate arranged for relative reciprocation in that holder, having an annular rim opposed to the margin of said web and to said female shear member supporting said margin; means arranged to relatively reciprocate said knockout plate in said holder; a male shear plate, in coaxial relation with said female shear member, and having an external shear edge member, adapted to cooperate with said female shear member; whereby a piece is stamped from the center of said web, leaving an annular portion of said web extending inwardly from said rim, transversely to the axis of said body; and means arranged to relatively axially move said two opposed annular clamping members, with said tubular body and relatively to said annular female shear member; whereby the marginal portion of said web is drawn over said female shear member, and expanded outwardly, to cylindrical form, in continuation of said rim.

4. In die mechanism, the combination with axially opposed annular members arranged for relative telescopic movement and for axial movement together, and arranged to coaxially clamp between them the cylindrical perimeter of a cup shaped body having a central plane circular web transverse to the axis of said body; of an annular female shear die member adapted to fit within said body and support the margin of said web; a punch holder, in coaxial relation with said clamping members and connected with one of them; a knockout plate arranged for relative reciprocation in that holder, having an annular rim opposed to the margin of said web and to said female shear member supporting said margin; means arranged to relatively reciprocate said knockout plate in said holder; a male shear plate, in coaxial relation with said female shear member, and adapted to cooperate therewith; whereby a piece is stamped from the center of said web, leaving an annular portion of said web extending inwardly from said rim, transversely to the axis of said body; and means arranged to relatively axially move said two opposed annular clamping members, with said tubular body and relatively to said annular female shear member; whereby the marginal portion of said web is drawn over said female shear member and expanded outwardly, to tubular form, in continuation of said rim.

5. In die mechanism, the combination with axially opposed annular members arranged for relative telescopic movement and for axial movement together, and arranged to coaxially clamp between them the cylindrical perimeter of a cup shaped body having a central circular web transverse to the axis of said body; of an annular female shear die member adapted to fit within said body and support the margin of said web; a punch holder, in coaxial relation with said clamping members and connected with one of them; a knockout member having an annular rim opposed to the margin of said web and to said female shear member supporting said margin; means arranged to relatively reciprocate said knockout member; a male shear plate, in coaxial relation with said female shear member, adapted to cooperate therewith; whereby a piece is stamped from the center of said web, leaving an annular portion of said web extending inwardly from said rim, transversely to the axis of said body; and means arranged to axially move said two opposed annular clamping members, with said tubular body and relatively to said annular female shear member; whereby the marginal portion of said web is drawn over said female shear member, and expanded outwardly, to tubular form, in continuation of said rim.

6. In die mechanism, the combination with means arranged to clamp the cylindrical perimeter of a cup shaped body having a central circular web transverse to the axis of said body; of an annular female shear die member adapted to fit within said body and support the margin of said web; a punch holder, in coaxial relation with said clamping means; a male shear member, in coaxial relation with said female shear member, and adapted to cooperate therewith; whereby a piece is cut from said web, leaving an annular portion of said web extending inwardly from said rim, transversely to the axis of said body; and means arranged to relatively axially move said clamping means, with said tubular body and relatively to said annular female shear member; whereby the marginal portion of said web is drawn over said female shear member, and expanded outwardly, to tubular form, in continuation of said rim.

7. In die mechanism, the combination with means arranged to clamp the cylindrical perimeter of a cup shaped body having a central circular web transverse to the axis of said body; of an annular female shear die member adapted to fit within said body and support the margin of said web; a punch holder, in coaxial relation with said die member; a male shear member, in coaxial relation with said female shear member, and adapted to cooperate therewith; whereby a piece is cut from said web, leaving an annular portion of said web extending inwardly from said rim, transversely to the axis of said body; and means arranged to relatively axially move said clamping means, with said tubular body and relatively to said annular female shear member; whereby the marginal portion of said web is drawn over said female shear member and expanded outwardly, to tubular form, in continuation of said rim.

8. In die mechanism, the combination with axially opposed cylindriform members arranged for relative axial movement and for axial movement together, arranged to clamp between them the cylindrical perimeter of a cup shaped body having a circular web transverse to the axis of said body; of an annular female shear die member adapted to fit within said body and support the margin of said web, and having an internal shear edge; a punch holder, in coaxial relation with said clamping members and rigidly connected with one of them; a knockout member arranged for relative reciprocation in that holder, having an annular rim opposed to the margin of said web and to said female shear member supporting said margin; means arranged to relatively reciprocate said knockout member in said holder; a male shear plate, in coaxial relation with said female shear member, and having an external shear edge, adapted to cooperate with said female shear member; whereby a piece is stamped from said web, leaving an annular portion of said web extending inwardly from said rim, transversely to the axis of said body; and means arranged to relatively move said clamping members, with said tubular body and relatively to said annular female shear member; whereby the marginal portion of said web is drawn over said female shear member, and expanded outwardly, to tubular form, in continuation of said rim.

9. In die mechanism, the combination with axially opposed annular members arranged to clamp between them the cylindrical perimeter of a cup shaped body having a circular web transverse to the axis of said body; of an annular female shear die member adapted to fit within said body and support the margin of said web, and having an internal shear edge; a punch holder, in coaxial relation with said clamping members and rigidly connected with one of them; a knockout member arranged for relative reciprocation in that holder, having an annular rim opposed to the margin of said web and to said female shear member supporting said margin; means arranged to relatively reciprocate said knockout member in said holder; a male shear plate, in coaxial relation with said female shear member, and having an external shear edge, adapted to cooperate with said female shear member; whereby a piece is stamped from said web, leaving an annular portion of said web extending inwardly from said rim, transversely to the axis of said body; and means arranged to relatively move said clamping members, with said tubular body and relatively to said annular female shear member; whereby the marginal portion of said web is drawn over said female shear member, and expanded outwardly, to tubular form, in continuation of said rim.

10. In die mechanism, the combination with axially opposed annular members arranged to clamp between them the cylindrical perimeter of a cup shaped body having a circular web transverse to the axis of said body; of an annular female shear die member adapted to fit within said body and support the margin of said web, and having an internal shear edge; a punch holder; a knockout member arranged for relative reciprocation in that holder, having an annular rim opposed to the margin of said web and to said female shear member supporting said margin; means arranged to relatively reciprocate said knockout member in said holder; a male shear plate, in coaxial relation with said female shear member, and having an external shear edge adapted to cooperate with said female shear member; whereby a piece is stamped from said web, leaving an annular portion of said web extending inwardly from said rim, transversely to the axis of said body; and means arranged to relatively move said clamping members, with said tubular body and relatively to said annular female shear member; whereby the marginal portion of said web is drawn over said female shear member, and expanded outwardly, to tubular form, in continuation of said rim.

11. In die mechanism, the combination with axially opposed annular members arranged to clamp between them the cylindrical perimeter of a cup shaped body having a circular web transverse to the axis of said body; of an annular female shear die member adapted to fit within said body and support the margin of said web, and having an internal shear edge; a punch holder; a knockout member having an annular rim opposed to the margin of said web and to said female shear member supporting said margin; means arranged to relatively axially move said knockout member; a male shear plate, in coaxial relation with said female shear member, and having an external shear edge, adapted to cooperate with said female shear member; whereby a piece is stamped from said web, leaving an annular portion of said web extending inwardly from said rim, transversely to the axis of said body; and means arranged to relatively move said clamping members, with said tubular body and relatively to said annular female shear member; whereby the marginal portion of said web is drawn over said female shear member, and expanded outwardly, to tubular form, in continuation of said rim.

12. In die mechanism, the combination with means arranged to clamp the cylindrical perimeter of a cup shaped body having a circular web transverse to the axis of said body; of an annular female shear die member adapted to fit within said body and support the margin of said web, and having an internal shear edge; a punch holder; a knockout member, having an annular rim opposed to the margin of said web and to said female shear member supporting said margin; means arranged to relatively axially move said knockout member; a male shear member adapted to cooperate with said female shear member; whereby a piece is stamped from said web, leaving an annular portion of said web extending inwardly from said rim, transversely to the axis of said body; and means arranged to relatively move said clamping members, with said tubular body and relatively to said annular female shear member; whereby the marginal portion of said web is drawn over said female shear member, and expanded outwardly, to tubular form, in continuation of said rim.

In testimony whereof, I have hereunto signed my name at Conshohocken, Pennsylvania, this 14th day of January, 1922.

JOSEPH WILLIAM WINTER.

Witnesses:
H. SERKOENIG,
A. T. SNOW.